UNITED STATES PATENT OFFICE.

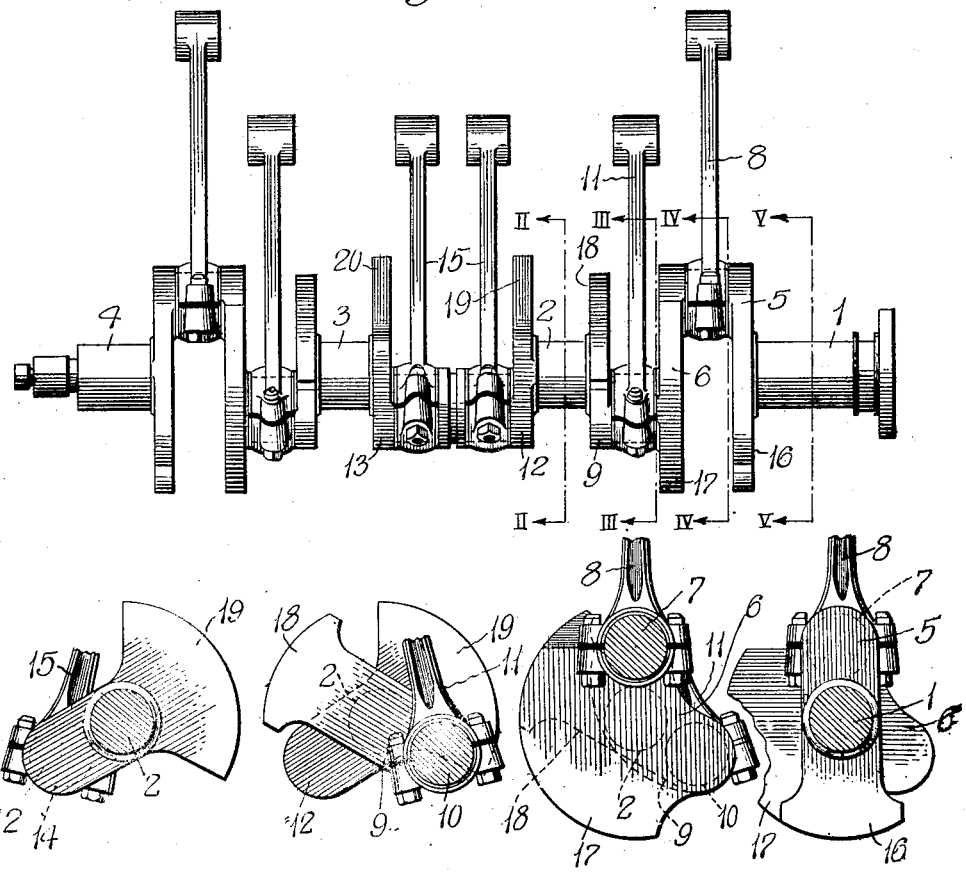

ROBERT A. WEINHARDT, OF CHICAGO, ILLINOIS, ASSIGNOR, BY MESNE ASSIGNMENTS, TO CONTINENTAL MOTORS CORPORATION, OF DETROIT, MICHIGAN, A CORPORATION OF VIRGINIA.

CRANK-SHAFT ASSEMBLY.

1,355,439.     Specification of Letters Patent.     Patented Oct. 12, 1920.

Application filed May 15, 1916. Serial No. 97,550.

*To all whom it may concern:*

Be it known that I, ROBERT A. WEINHARDT, a citizen of the United States of America, residing at Chicago, in the county of Cook and State of Illinois, have invented certain new and useful Improvements in Crank-Shaft Assemblies, of which the following is a specification, reference being had therein to the accompanying drawings.

In the operation of high speed motors where the crank shaft and rotating parts of the connecting rod assembly travel at high speed, it is desirable that the parts be so arranged as to effectively neutralize the tendency of the connecting rod to throw the shaft out of dynamic balance between its center support and thereby cause side strain upon the bearings.

This invention relates to a crank shaft and connecting rod assembly and to a disposition of the parts such that the running balance of the shaft and connecting rods does not produce lateral strain upon the bearings or tend to bend or weave the shaft.

The invention consists in the matters hereinafter set forth, and more particularly pointed out in the appended claims.

In the drawings,

Figure 1 is a view of a crank shaft and connecting rod associated therewith embodying features of the invention;

Fig. 2 is a view taken on or about line II—II of Fig. 1;

Fig. 3 is a view in section taken on or about line III—III of Fig. 1;

Fig. 4 is a view in section taken on or about line IV—IV of Fig. 1, and

Fig. 5 is a view in section taken on or about line V—V of Fig. 1.

As herein shown a multi-throw crank shaft herein illustrated as of six-throw four-bearing type, has journal portions 1, 2, 3 and 4, between which the crank and wrist pin connections are disposed.

As herein shown a short arm 5 coöperates with one extremity of a long arm 6 to provide a wrist pin connection 7 for a connecting rod 8. The other end portion of the long arm 6 coöperates with a short arm 9 to provide a wrist pin connection 10 for a connecting rod 11. A short arm throw crank 12 with a corresponding short throw crank arm 13 forms a wrist pin connection 14 for two connecting rods 15, the middle of the shaft being between these two connecting rods 15 and the shaft being duplicated in inverse order beyond there.

To provide for the running balance, the connecting rod 8 which is of typical form is balanced by an enlargement 16 of the short arm 5 that is sufficient to take care of the attempt of the connecting rod 8, because of its inertia, to impose stress upon the bearing 1, this provision consisting in a sufficient enlargement to bring the center of mass of the connecting rod 8, the arm 5 and other associated parts of the shaft directly within the circle of throw of the crank and thereby so reduce the couple that would be produced otherwise by the irregular moving mass 8 that its effect is practically *nil* upon the crank shaft bearing. The crank arm 6 is likewise provided with an enlargement 17 and takes care not only of part of the connecting rod 8 but coöperates with an enlargement or balance weight 18 on the short arm 9 to prevent the eccentric movement and irregular mass of the members 11 from producing weave or vibration in the shaft.

Similarly the crank arms 12 and 13 have extensions 19 and 20 formed thereon whereby the associated connecting rods 15 do not tend to cause the crank shaft to vibrate. Furthermore the mass is sufficient to bring the center of gravity both of the crank arms and of the connecting rods within the circle of throw of the crank and thereby practically eliminates the tendency of the parts when running to exert sidewise pressure upon the bearing.

As a result the crank shaft as a whole together with the connecting rod assembly exerts no side pull upon the bearings even when running at high speed and therefor the wear on the bearings and the proportioning of the bearing surfaces and of the members are not similar to a standard construction where the forces resulting from unbalance have to be taken into consideration.

Obviously, changes in the details of construction may be made without departing from the spirit of my invention and I do not care to limit myself to any particular form or arrangement of parts.

What I claim is:—

1. A crank shaft assembly for internal combustion engines comprising a multi-throw crank shaft having journals at regular intervals, connecting rods the centers of gravity of which lie outside the crank pin axes on the shaft, and counterweights on the shaft so disposed in relation to the several crank-shaft sections and connecting rods that the couples resulting from the revolution of the parts practically neutralize each other and that the axis of rotation which the parts tend to assume is substantially coincident with the actual axis of rotation of the shaft.

2. A crank shaft and connecting rod assembly for internal combustion engines comprising a crank shaft having crank arms and connecting rods the centers of gravity of which lie outside the crank pin axes operatively connected thereto, said assembly being provided with counterbalancing portions for and so disposed in the assembly that the couples set up by the parts when revolving neutralize each other and the axis of rotation which the revolving parts tend to assume is brought into coincidence substantially with the actual axis of rotation of the shaft, the counterbalancing portions being in the form of weight formations applied solely to the crank-shaft portion of the assembly with the value of the formations such as to produce the couple neutralization of the assembly.

3. An assembly of the type of claim 1, characterized in that the counterweights are applied to the crank-shaft radially opposite the resultant centrifugal forces of the various irregular masses of each section to dynamically balance such resultant force.

4. An assembly of the type of claim 2 characterized in that the weight formations are in the form of enlargements applied to the crank arms of each section of the shaft between the journals and disposed with the center of balance thereof radially opposite the resultant of the centrifugal forces of the irregular revolving masses of the sections.

In testimony whereof I affix my signature in presence of two witnesses.

ROBERT A. WEINHARDT.

Witnesses:
 C. R. STICKNEY,
 A. M. DORR.